Patented Mar. 18, 1930

1,750,767

UNITED STATES PATENT OFFICE

MERWYN C. TEAGUE, OF JACKSON HEIGHTS, NEW YORK, ASSIGNOR TO THE NAUGATUCK CHEMICAL COMPANY, OF NAUGATUCK, CONNECTICUT, A CORPORATION OF CONNECTICUT

METHOD FOR TREATING AQUEOUS DISPERSIONS OF RUBBER AND PRODUCTS OBTAINED THEREBY

No Drawing. Application filed October 28, 1925. Serial No. 65,492.

This invention relates to an improved method for preparing stable mixtures of aqueous dispersions of rubber and wood tars and distillation products.

It has not been hitherto possible to prepare stable compositions of rubber dispersions and wood distillation products such as the acid tars for the reason that the acidic, alcoholic and phenolic nature of the tars causes coagulation of the rubber dispersion. For this reason the adhesive properties of such materials as pine tars as well as their softening effect has not been utilized in adhesive compositions which consists in part of aqueous dispersions of rubber. According to the present invention a method has been developed whereby such softeners with acidic, alcoholic or phenolic properties can be mixed with rubber dispersions, either artificial or natural to give stable compositions having desirable adhesive properties.

The invention accordingly comprises a method for introducing wood distillation products, particularly the acidic tars, into aqueous rubber dispersions to form stable fluid compositions. The invention also has as one of its objects an improved adhesive composition and method of making the same.

With the preferred embodiment in mind but without intention to limit the invention beyond what may be required by the prior art, the invention consists in neutralizing the acidic wood distillation products with a base, mixing the neutralized product with another agent adapted to increase the adhesive properties of a rubber dispersion, forming an emulsion of the mixture in the presence of an emulsifying agent, and combining the emulsion thus formed with an aqueous dispersion of rubber.

In carrying out the invention, an acidic ligneous product such as pine tar is carefully neutralized with a base. For this purpose a solution of soda ash, sodium hydroxide or of ammonia may be employed. The neutralized tar may then be mixed with say an equal quantity of a neutral resin such as cumar or para indene. This mixture is then emulsified in a non-solvent thereof, preferably water, an emulsifying agent being employed. The emulsion which is thus formed may then be mixed with an aqueous dispersion of rubber which may or may not contain other ingredients. The composition so formed will be found to be quite stable over a period of time. It is also a desirable adhesive, particularly suitable for applying to fabrics, or other cheap materials, such as leather. It may be used as a shoe cement.

To illustrate the invention, 12½ parts of acidic pine tar are carefully neutralized with .22 parts of sodium hydroxide or an equivalent of ammonia. With the neutralized tar are mixed 12½ parts of cumar resin. The mixture is warmed and emulsified in 17 parts of water containing 1.25 parts of saponin or Karaya gum. The emulsion, comprising approximately 44 parts, is then mixed with 100 parts of rubber as latex. This composition will be stable for at least two months, and the stability range is considerably greater than is required for manufacturing purposes.

By neutralizing the acid tar and mixing it with another agent adapted to dull its coagulating effect without destroying the adhesive properties of the tar, a two-fold purpose may be accomplished in combining a material which has coagulative properties with a rubber dispersion and at the same time preparing an adhesive composition whose stickiness has been increased by the addition of the tar. Instead of employing the cumar resin above mentioned, a mineral oil such as spindle oil may be employed as the ingredient which is mixed with the neutralized tar. Instead of the tar, other wood distillation products such as turpentine and the like may be substituted. The mixture of neutralized tar and resin can be emulsified by any suitable method, and the emulsifying agent may be Karaya gum, glue, saponin, or other material.

Having thus described my invention, what I claim and desire to protect by Letters Patent is:

1. A method of forming stable compositions from acidic substantially water-insoluble wood distillation products and aqueous dispersions of rubber which consists in neutralizing said wood distillation products, mixing an approximately neutral hydrocarbon containing material therewith, emulsifying the mixture in a substantially nonsolvent thereof, and combining said emulsion with aqueous dispersions of rubber.

2. A method of forming stable compositions from acidic substantially water-insoluble wood distillation products and aqueous dispersions of rubber which consists in neutralizing said distillation products, emulsifying a mixture of said neutralized product and a neutral resinous material, and combining the emulsion with an aqueous dispersion of rubber.

3. A method of forming stable compositions from pine tar and aqueous dispersions of rubber which consists in neutralizing the pine tar with a base, mixing the neutralized tar with a neutral resin, forming an emulsion of said mixture and adding the emulsion to an aqueous rubber dispersion.

4. A method of forming stable compositions from pine tar and aqueous dispersions of rubber which consists in neutralizing the pine tar with an alkali, mixing the neutralized tar with cumar resin, emulsifying said mixture in a substantially non-solvent thereof in the presence of an emulsifying agent, and adding said emulsion to the aqueous rubber dispersion.

5. A method of forming adhesive compositions from pine tar and rubber latex which consists in neutralizing the pine tar with ammonia, mixing cumar resin therewith, emulsifying the mixture in water containing Karaya gum, and adding the emulsion to the rubber latex.

6. A stable adhesive composition containing an aqueous rubber dispersion and an emulsion comprising equal parts of alkali neutralized pine tar and cumar resin.

7. A stable composition containing an aqueous rubber dispersion and an emulsion of neutralized pine tar and cumar resin.

Signed at New York, county and State of New York, this 20th day of October, 1925.

MERWYN C. TEAGUE.